INVENTOR.
CHARLES C. LIBBY

Feb. 6, 1968    C. C. LIBBY    3,368,086

SONIC TRANSDUCER

Filed Nov. 19, 1965    2 Sheets-Sheet 2

INVENTOR.
Charles C. Libby
BY

ABSTRACT OF THE DISCLOSURE

The invention is a mechanically-biased higher-power, high-Q transducer utilizing the principles of the transducer in the copending application, S.N. 508,812. The over-all structure is enclosed and includes a means of positioning or applying external force through a holding fixture supported near the node of the transducer. The electrical power connections for the driving elements located within the enclosure are reliable under continuous high-power excitation. The clamping arrangement providing internal static stress or mechanical-bias is acoustically an integral part of the horn. The output end of the transducer is threaded for attachment coupling to the tool. The enclosure is hermetically sealed for safe operation in the field, and to permit oil cooling of the transducer. It has been found that oil cooling improves the electrical insulation, reduces operating temperatures and allows the applied voltage to be increased with the same life expectancy. This in turn raises the potential output-power rating of the transducer.

Background

A piezoelectric transducer is a device capable of transforming high frequency electrical impulses into high frequency mechanical impulses. With an alternating-polarity input-voltage imposed on the piezoelectric elements, the transducer generates, transmits and amplifies a series of mechanical compression waves in its metal supporting structure. The succession of identical compression and tension waves transmitted in a transducer of proper length, produces a standing wave pattern.

In a straight bar the standing wave maxima and minima locations correspond respectively to locations of maximum and minimum velocity, minimum and maximum stress, and maximum and minimum displacement on the transducer body. These locations determine optimum positions for points-of-support, "steps" or changes in diameter, tools or mechanical couplers, etc. The node locations on the transducer correspond to locations of minimum axial displacement and velocity, the anti-node locations correspond to locations of minimum axial displacement and velocity or motion. The distance measured on the transducer between adjacent anti-nodes is equal to one-half wavelength at the fundamental reasonance frequency.

The prior art is replete with various forms of electromechanical transducers. Piezoelectric, as well as magnetostrictive devices, have been developed for various and sundry applications. The uses of sonic energy has been suggested extensively in all fields of endeavor including cleaning processes, chemical and physical processes, work transfer, measuring instruments, communications, etc.

There is disclosed in the co-pending application filed herewith, S.N. 508,812, for "Transducer," a sonic transducer that combines the driving element (piezoelectric ceramic) with the mechanical displacement amplifier in a novel way. It is in essence a resonant horn structure excited internally close to the vibrational node. The excitation is in contrast to the external excitation common when horns are utilized in a sonic transducer system. The transducer therein disclosed is capable of extremely high power, is a high Q transducer, is exceptionally rugged, compact, and capable of carrying continuous work loads. The present invention is an extension and refinement of the transducer disclosed in said co-pending application.

Brief description of invention

More specifically, the present invention is a mechanically-biased high-power transducer, utilizing the principles of the transducer in the aforementioned application, and yet overcomes the mechanical failures attendant with the prior art transducers. Particularly, the over-all structure is enclosed and includes a means of positioning or applying external force through a holding fixture supported near the node of the transducer. The electrical power connections for the driving elements located within the enclosure, are reliable under continuous high-power excitation. The clamping arrangement providing internal static stress or mechanical-bias is acoustically an integral part of the horn. The output end of the transducer is threaded for attachment coupling to the tool. The enclosure is hermetically sealed for safe operation in the field, and to permit oil cooling of the transducer. It has been found that oil cooling improves the electrical insulation, reduces operating temperatures and allows the applied voltage to be increased with the same life expectancy. This in turn raises the potential output-power rating of the transducer.

Objects

It is accordingly a principal object of the present invention to provide a new and improved structural arrangement of an electromechanical transducer.

A further object of the invention is to provide an electromechanical transducer that is more rugged and capable of withstanding higher output power.

Another object of the present invention is to provide an electromechanical transducer having means integrally formed therewith for applying external loads and having means for utilizing the output power.

Another object of the present invention is to provide an electromechanical transducer having means integrally formed therewith for cooling to thereby permit an increase in operating level.

Still another object of the present invention is to provide a high power electromechanical transducer that is completely reliable, may be reproduced with simplicity and with repetitive results.

Further objects and features of the present invention will become apparent from the following detailed description when taken in conjunction with the drawings in which:

Detailed description of the drawings

In accordance with the general concepts of the electromechanical transducer described in the aforementioned co-pending application, a horn type of displacement amplifier a half-wave long has been divided in two parts. The piezoelectric transducer elements are placed between the two parts. The lower part of the horn is tapered— in one manner or another. The upper part of the horn structure is turned down to bolt size and snugly fits into a bore to complete the upper part. This bolt provides the mechanical bias as a compressive stress larger in magnitude than the maximum amplitude of the alternating stress generated in the piezoelectric elements. A nut on the upper part of the bolt joins the component parts under compression.

The present invention utilizes the theory and principles of mechanical structure of the transducer of the aforementioned co-pending application and improves thereon in several significant structural features and further incorporates therein certain innovations.

Figures 1, 2:
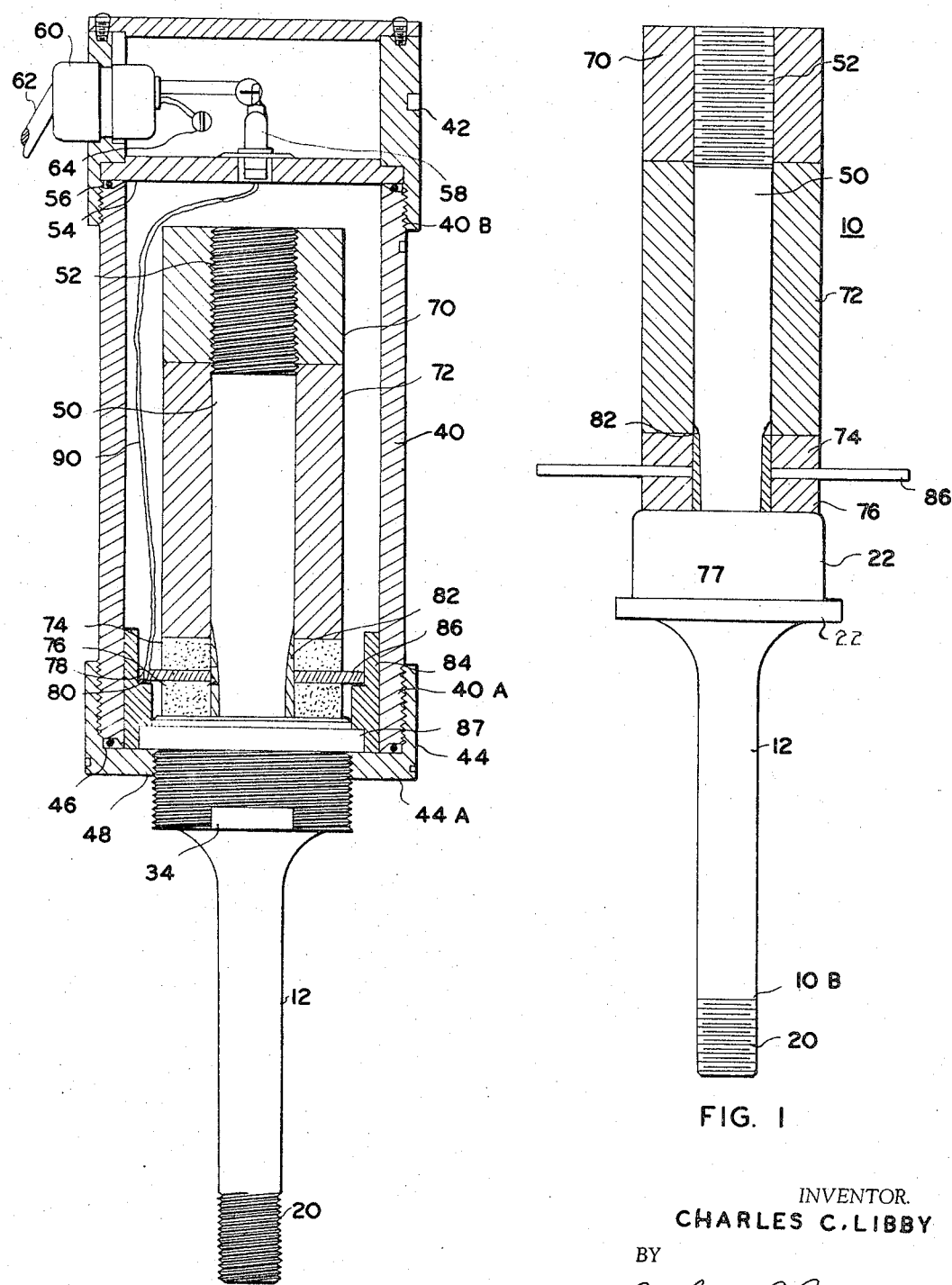
FIGURE 1 is a schematic illustration in cross-section of the electromechanical transducer of the present invention.
FIGURE 2 is a schematic illustration in cross-section of a preferred embodiment of the electromechanical transducer of the present invention.

Referring now to FIGURE 1, there is shown a schematic of the transducer of the present invention. The transducer 10 constitutes in essence a single structure—a horn (mechanical displacement amplifier). The overall horn is a half-wavelength long and subdivided into two parts, 10a and 10b. For purposes of simplicity, the transducer may be described as comprising a tapered bar 12, a non-tapered section 72, and piezoelectric driver elements 74 and 76. It is to be understood that the term wafer as used herein comprises a disc-like structure having a concentrically located aperture.

More specifically, the integral structure includes the tapered bar 12 extending from its threaded tip 20 to the flange 22a. The tapered metal is originally of bar stock and turned down also to form a bolt 50 extending through the piezoelectric elements 74 and 76, the electrode 86 therebetween and upwardly to the upper threaded end 52. At the junction of the bolt 50 and body 22 the body is undercut slightly at 77. The upper metallic spacer 72 is bored to receive the bolt 50 and is fitted thereon above the piezoelectric wafers 74 and 76. A nut 70 is screwed on the threaded end 52 of bolt 50 to secure the entire structure. An insulating sleeve 82 is positioned between the bolt 50 and the piezoelectric wafers 74 and 76 with the electrode 86 therebetween. The diameter of the electrode 86 in FIG. 1 was selected to be in the order of twice the diameter of the transducer to increase the rate of dissipation of the heat generated by piezoelectric wafers 74 and 76.

The step in the horn adjacent to flange 22a has been located half an inch below the node and the piezoelectric elements 74 and 76 have been located above the node. Although this configuration may cause a small reduction in amplification, the step and the active elements are spaced apart to make the node available for attachment of clamps and holding fixtures at the flange 22a.

Referring to FIGURE 2, there is shown a preferred embodiment of the transducer incorporating the new and improved features of the present invention. The enclosure case 40 has, at its lower end, the threaded portion 40a adapted to receive in threaded engagement lower cap 44. The lower cap 44 also comprises a bottom section 44a in threaded engagement with the transducer thread 34. Neoprene rings 46 and 48 assist in sealing the lower case.

The enclosure 40 has at its upper end the threaded portion 40b adapted to receive in threaded engagement upper cap 42. The upper cap 42 further comprises cover plate 42a. Neoprene ring 56 assists in sealing the upper case to bulkhead 54. This enclosure supports the structure and provides for electrical feed through 58. Fitted in an aperture in the side wall of the upper cap 42 is the strain relief fitting 60. The incoming power cable 62 is fed through the strain relief fitting with the inner conductor thereof connected to the upper end of feedthrough 58 and the outer conductor grounded at 64.

The threaded portion of the transducer 34 extends to the lowermost part of the enclosed structure. The upper part 22b of the threaded section 34 rests on the inside of the bottom section 44a. Integral with the transducer part 12 bolt 50 centrally positioned within the housing. As pointed out above, the integral structure within the enclosure is approximately a ¼-wave in length or approximately one-half of the one-half wave resonant structure. Surrounding the bolt 50 are a pair of piezoelectric ceramic wafers 74 and 76. These elements are separated by the electrode 86.

Polarity checks on transducer ceramic wafers are necessary occasionally, but only where manufacturers' polarity markings have been removed. Polarity of ceramic wafers is important to insure either that the positive side of both ceramics face the electrode, or that the negative side of both ceramics face the electrode. To this degree, consistency and identification to permit consistency, is important. Lacking a polarity marking, heat applied to the ceramic ring will generate a detectable voltage. Marking of the side of each of the ceramic rings corresponding to positive voltage will assure proper polarity.

A glass fibre melamine-impregnated or similar material tube 84 cut to fit the lowermost portion of the inner structure has one end resting on the flange 87. An upper portion of the tube 84 supports the electrode 86 on a wave washer 80.

The bolt portion 50 of the transducer is shown necked down in the wafer region to permit insulator 82 to be inserted between the wafers and the bolt. Alternatively, the spacer may be counterbored and the bolt diameter decreased. The insulator 82 which may be a high dielectric tape is trimmed lengthwise to cover the necked-down section of the bolt 50. It is built up in layers to such a thickness that a test ceramic wafer can just be forced over the taped section manually. The surface must be smooth, cylindrical and free from bubbles or threads. Any gaps between the ceramic wafer and this insulated surface will cause premature failure. The complete insulated surface 82 is preferably flush with the maximum outside diameter of the bolt section.

The upper portion of the bolt 50 is threaded at 52 to receive the nut 70. This nut 70 forces the spacer 72 to press down on the two piezoelectric wafers 74 and 76 thus applying the necessary static compression to these elements. This pressure is also utilized as described below to activate wave washer 80. The nut 70 and the spacer 72 may be formed from hexagonal or other standard flat-sided metal stock. The flat portions providing gripping portions for torquing also as described below. In contradistinction to prior art transducers these elements do not require a machine finish on the outer surface.

The hermetically sealed feed-through 58 is a small, hollow, ceramic cylinder with a metallic tube in the center, through which the conductor 90 may be inserted. The tube is then soldered closed on the outside. A skirt on the periphery of the feed-through 58 is soldered to the upper surface of the bulkhead 54.

The electrical input wire 90 mentioned above is fed through the feed-through to electrical contact with the electrodes 86. The conducting ring 78 has soldered thereto the wire 90 for continuous electrical contact with the electrodes 86. The conducting ring 78 thus serves as the terminal conductor adjacent to electrode 86. By means of this arrangement, friction contact alone exists between the conducting ring 78 and the electrode 86. With this type of contact, the necessary sonic agitation of the electrode does not stress the electrical connections illustrated and adequate life expectancy results. This is particularly important in a closed sealed transducer assembly. The multiple points of friction contact between the wave washer 80 and the electrode 86 is assured a transfer of electrical energy to the piezoelectric wafers 74 and 76 despite the unavoidable sonic agitation of the contact points.

In the assembly of the transducer of FIGURE 2, the electrode 86 is pressed against the conducting ring 78 when the sub-assembly is torqued down due to the action of wave washer 80. The steps of assembly after insulation 82 is in place are as follows: Wafer 76 is first installed. The wave-washer 80 is then placed on a step in the melamine sleeve 84; the conducting ring is then placed on the sleeve followed by the electrode 86 and wafer 74. Spacer 72 is then added. The electrode 86 is pressed against the washer-ring combination when the transducer nut 70 is tightened during torquing down. The notch in the electrode is so located that the electrode 86 does not press against the insulated wire 90 where it terminates on the conducting ring 78.

The two piezoelectric ceramic wafers 74 and 76 face the electrode symmetrically as described. The ceramic wafers 74 and 76 fit finger tight over the insulated sleeve 82 on the transducer body. The wave-washer 80, the electrode 86, and conducting ring fit into the inside diameter of the melamine sleeve 84. The melamine sleeve 84 fits the step 87 in the maximum O.D. of the transducer body. Each of these fits should be suitable for manual assembly and additional force is not required.

When spacer 72 and nut 70 are first placed over the center bolt 50 they should be tightened to just a press fit. Application of pressure on the piezoelectric elements will cause a voltage to be generated. For this reason the protruding conductor should be grounded to the transducer body after tightening. If the transducer has been properly assembled, a considerable spark will be generated by the torquing-down procedure which is described hereinafter.

The feed-through closure (bulkhead) 54 is part of the upper cap 42 of the enclosing case 40. It does not rotate but is forced into intimate contact with the top O-ring 56 by the pressure of the upper cap 42. This eliminates stresses being generated in conductor 90 by rotation of the cap 42 during assembly of the case 40.

The cylindrical enclosure case 40 is threaded over the transducer from the horn end. The small O-ring 48 is located at the transducer lip just above the flats. The lower O-ring 46 is placed inside the lower cap 44 before the case is screwed to the transducer. The closure (bulkhead) 54 is slid in place across the O-ring 56 and the upper cap 42 is screwed to case 40 while holding the closure 54 from rotating (until the last turn).

A procedure required to reestablish the proper static compressive force within the transducer subassembly has become known as torquing-down a transducer. This torque may be developed, for example, by a force exerted tangentially at a radius of rotation of one foot. The use of a torque-wrench is advisable for this purpose.

The pound feet of torque that is required for proper torquing-down is measured during the time the nut 70 is turning on the spacer 72. That is, pound feet of dynamic torque is required. A static torque, i.e., that measured in the absence of rotation, would need to be considerably (but not predictably) higher in value to produce the same compression.

Excessive torque exerted on the transducer ceramic elements may cause immediate fracture. Torque of 100 pound feet may be utilized, in a three-quarter inch twenty-thread assembly with a one and one-half inch diameter piezoelectric wafer having a three-quarter inch aperture. Shorter life of the piezoelectric ceramics may be expected at higher torques. Raising the pressure on the transducer ceramic will have the effect of raising the transducer resonant-frequency.

Restraining spacer 72 from rotation is necessary during torquing-down in order to prevent the spacer from abrading the face of the piezoelectric ceramic 74. If it is desired to reduce friction between the spacer and nut, molybdenum disulphide may be used on the interface.

The wave washer 80, in the preferred embodiment of FIGURE 2, is important to the success of an enclosed transducer since it insures long life to the electrical junction (at or near the electrode) between the lead-in wire and the electrode. Several arrangements utilizing this principle are shown in FIGS. 4a, 4b, 4c, and 4d.

Figure 4A:
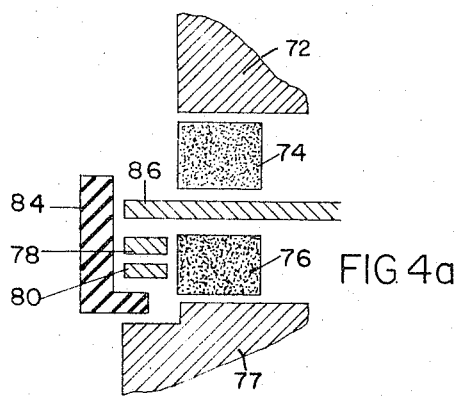

The several arrangements illustrated each use very stiff springs under a predetermined stress. These arrangements permit high velocity, high frequency axial and radial motion to exist within the electrode without fatiguing the electrical lead providing excitation. The wave washer principle is illustrated in the exploded detail showings of FIGURES 4a, 4b, and 4c. The detail views of FIGURES 4a and 4b illustrate two views of the wave washer 80, conduction ring 78 and electrode 86. In FIGURES 4a and 4b, the electrode 86 is pressed down on the wave washer 80 by the static compression force used to mechanically "bias" the crystals 74 and 76 as described above. The wave washer 80 is prevented from moving by the interference provided by the step in the sleeve 84. The conducting ring 78 carries the exciting current, and is pressed against the electrode 86 by the wave washer 80. The wave washer 80 carries no current. The current is applied to the conducting ring 78 by the insulated electrical lead 90 passing through a notch in the electrode 86 and terminating in an electrical junction with the ring 78.

Figure 4C:
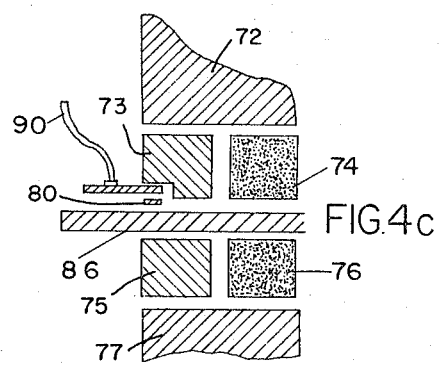
Figure 4B:
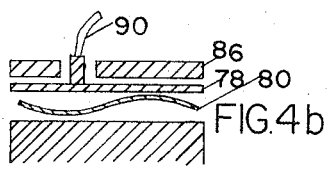

In FIGURE 4c there is illustrated an alternate design in which the wave washer 80 carries both mechanical stress and electrical current. In the embodiment 4c the electrical lead 90 is connected directly to the conducting ring 78 and maintained in position by the wave washer 80.

Figure 4D:
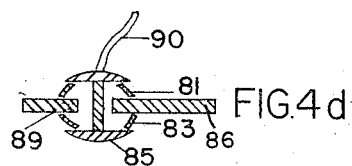
Figure 3:
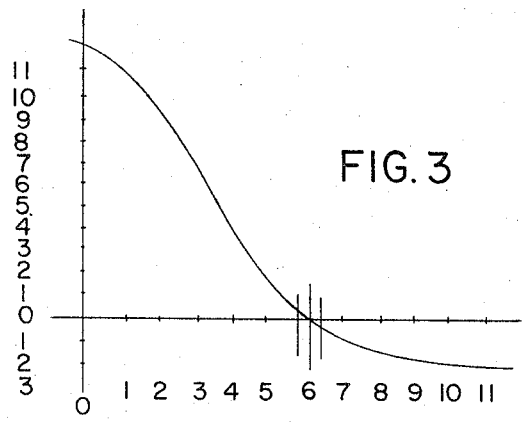
FIGURE 3 is a graph illustrating the curve of acoustic displacement versus distance from the transducer tip; and, FIGURES 4a, 4b, 4c, and 4d are alternate embodiments of the arrangement of the wave washer-conducting ring-electrode of FIGURE 2.

In the embodiment of FIG. 4d two very small diameter springs 81 and 83 replace the relatively large diameter springs or wave washer described above. The relatively large diameter spring employed waves to impart a great deal of stiffness to thin stock. The thin stock is essential for satisfactory life expectancy under intense sonic vibration. The high stress is essential to insure complete absence of sparking at the contact. The two Belleville washers 81 and 83 are "dished" washers of thin stock typically capable of maintaining a high force for a small deflection (compressive). The washers 81 and 83 are each positioned between the electrode 86 and the rivet 85 on opposite sides of the electrode. The electrical lead 90 is electrically connected to the rivet 85. In this way the washers 81 and 83 carry current and mechanical stress. The stress insures the two heads of rivet 85 are always in electrical contact with the washer 81 and 83, and the washer 81 and 83 with the electrode 86. The oversize hole 89 bored in the electrode 86 is larger in diameter than the shank of the rivet 85 passing through it.

A common feature to all these designs is that radial waves of compression and tension, within the electrode material, are not communicated to the electrical leads. The radial motion is dissipated in sliding friction on the electrode face. The transfer of the axial movement and of the radial movement to the electrical lead is eliminated by the wave washer, or by the Belleville washers. The spring is extremely stiff and follows the up-and-down movement or axial movement in each of these configurations thus maintaining contact between electrically excited elements with no sparking.

What is claimed is:
1. An electromechanical transducer having at least one piezoelectric element, the improvement comprising:
an electrode in intimate electrical contact with said piezoelectric element,
an electrical lead for electrically exciting said piezoelectric element through said electrode, and
sliding spring means for permitting continuous radial or axial sliding contact between said electrode and said lead without imparting movement to said electrical lead.

2. An electromechanical transducer as set forth in claim 1 wherein said electrical lead further comprises a conducting ring having said electrical lead connected thereto.

3. An electromechanical transducer as set forth in claim 2 wherein said conducting ring is held in electrical contact with said electrode by a wave washer.

4. An electromechanical transducer as set forth in claim 1 wherein said sliding spring means is a rivet and a pair of Belleville washers engaging said rivet with said electrode.

5. An electromechanical transducer as set forth in claim 3 wherein said wave washer is positioned between said conducting ring and said electrode.

6. An electromechanical transducer as set forth in claim 1 wherein said transducer includes a pair of piezoelectric elements, each element having a flat surface and wherein said electrode is in intimate electrical contact with the flat surface of each element.

7. An electromechanical transducer as set forth in claim 2 wherein said sliding means is relatively positioned to maintain electrical contact between said conducting means and said electrode.

8. An electromechanical transducer as set forth in claim 5 wherein said sliding means further carries electrical current from said conducting means to said electrode.

9. An electromechanical transducer as set forth in claim 5 wherein said sliding means is so positioned relative to said conducting element and said electrode that no excitation current passes therethrough.

References Cited

UNITED STATES PATENTS

| 2,814,741 | 11/1957 | Minnich | 310—9.4 |
| 2,817,778 | 12/1957 | Shepherd | 310—9.4 |
| 2,882,462 | 4/1959 | Zierdt | 310—9.4 |
| 3,328,610 | 6/1967 | Jacke | 310—8.3 |
| 3,331,589 | 7/1967 | Hammitt | 310—8.0 |

MILTON O. HIRSHFIELD, *Primary Examiner.*

J. D. MILLER, *Examiner.*